United States Patent [19]

Ojima et al.

[11] Patent Number: 4,702,726
[45] Date of Patent: Oct. 27, 1987

[54] TENSION PROVIDING DEVICE

[75] Inventors: Juji Ojima, Ebina; Isao Hino, Nagano, both of Japan

[73] Assignee: NHK Spring Co., Ltd., Yokohama, Japan

[21] Appl. No.: 853,882

[22] Filed: Apr. 21, 1986

[30] Foreign Application Priority Data

Apr. 26, 1985 [JP] Japan .................................. 60-90570

[51] Int. Cl.⁴ ............................................... F16H 7/08
[52] U.S. Cl. ...................................... 474/101; 474/138
[58] Field of Search ............... 474/101, 109, 111, 136, 474/138

[56] References Cited

U.S. PATENT DOCUMENTS

| 3,927,576 | 12/1975 | Colletti | 74/498 |
| 4,371,360 | 2/1983 | Ojima et al. | 474/111 |
| 4,466,802 | 8/1984 | Ojima et al. | 474/111 X |
| 4,472,161 | 9/1984 | Ojima | 474/138 X |
| 4,502,572 | 3/1985 | Davidson et al. | 188/72.8 |
| 4,506,768 | 3/1985 | Innocent | 188/370 |

FOREIGN PATENT DOCUMENTS

| 2132194 | 11/1973 | Fed. Rep. of Germany | 474/111 |
| 0059051 | 5/1981 | Japan | 474/111 |
| 0040149 | 3/1982 | Japan | 474/111 |
| 1038657 | 8/1983 | U.S.S.R. | 474/111 |

Primary Examiner—Stephen J. Novosad
Assistant Examiner—Thuy M. Bui
Attorney, Agent, or Firm—Fleit, Jacobson, Cohn & Price

[57] ABSTRACT

A tension providing device which enables to prevent the invasion of dust and water into a casing together with enabling the locking and the winding off of the torsion spring from the base side of the casing. This device is characterized by being provided with a rotatable shaft in the casing which only rotates by restraining the sliding in the axial direction of the casing, screwing the pushing body which slides by the rotation of the shaft with the shaft, supporting this screwed portion with bearing, and further screwing a seal bolt at the base portion of the casing.

4 Claims, 11 Drawing Figures

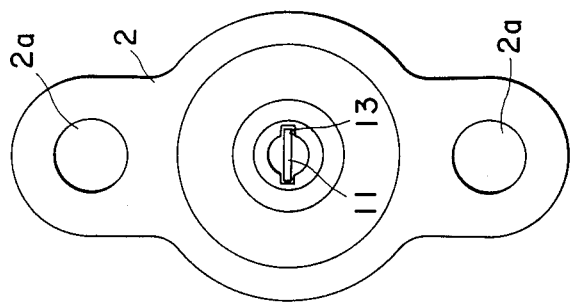
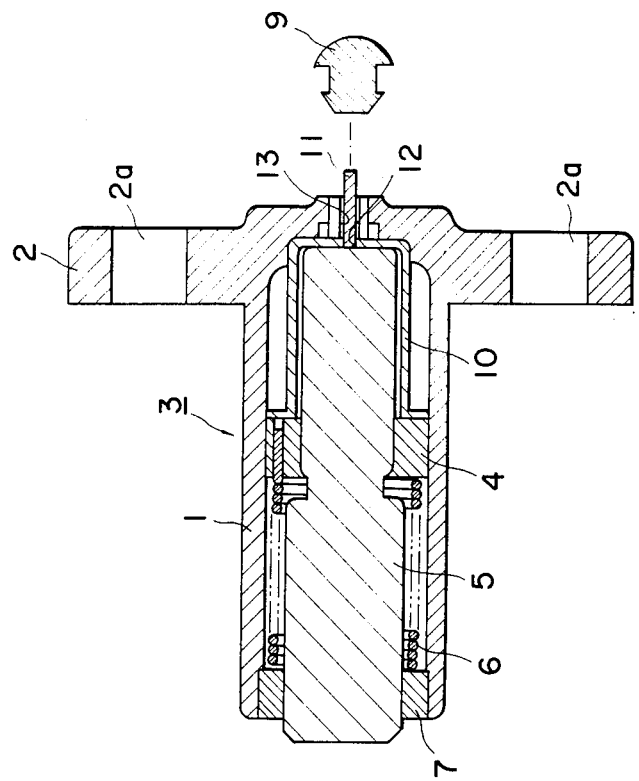
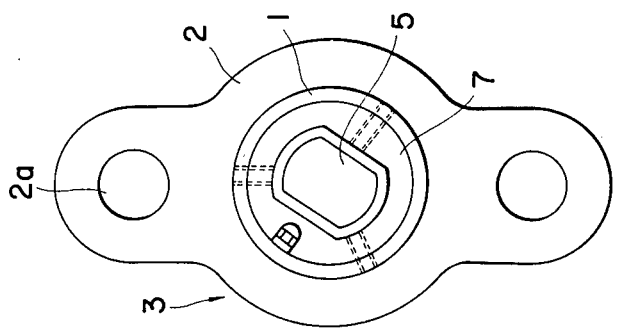
FIG. 7 Prior Art

TENSION PROVIDING DEVICE

BACKGROUND OF THE INVENTION

This invention relates to a tension providing device which provides a fixed tension. More particularly, it relates to a tension providing device which presses a chain or a timing belt to drive a cam shaft of an engine in a two-wheel auto or a four-wheel auto.

Heretofore, the tension providing device has been used as a chain tensioner or a belt tensioner. Even if the belt enlongate or contracts, or the distance between pulleys shortens, said tensioner presses the chain or the belt in a fixed direction to maintain a fixed tension.

FIG. 6 and FIG. 7 indicate the conventional tension providing devices used for such object. The mechanical parts of these device are provided in a casing 3 attached to the device of an engine and the like.

In FIGS. 6(a) and (b) the casing 3 comprises a cylinder portion 1 having a cavity portion 1a in an axial direction and a flange portion 2 extending from an end portion of the cylinder 1 crossing vertically therewith. An attaching bore 2a for inserting a bolt is formed at the flange portion 2 so that the cylinder portion 1 may be inserted into the device. The device shown in FIG. 6b is a rotor 4 having a disk shape attached to a step portion so as to abut it in the cavity portion 1a of the casing 3, a shaft 5 which slides in the axial direction of the cylindrical portion 1 by the rotation of the rotor 4 screwing with this, and a torsion spring 6 which rotates said rotor 4 secured to the outside of the shaft 5. Said shaft 5 presses the chain, belt or the like directly or indirectly with the aid of the end thereof, thereby providing a fixed tension thereto.

The shaft 5 has a nearly oval shape in the sectional area thereof and is inserted into a rotary prevention body 7 having the same above shape. Accordingly, the rotary motion of the rotor changes to a sliding motion in an axial direction, whereby the shaft 5 is adapted to advance from the casing 3. The rotation of the rotor 4 is carried out by the torsion spring 6 secured to the shaft 5. By this, one end 6a of the torsion spring being latched to the rotary prevention body 7 and another end 6b thereof being latched with the rotor 4. The torsion spring 6 is incorporated into the casing in a state provided with a fixed torque previously by being torsioned, thereby being allowed to rotate the rotor by aid of its stability. Further, the numeral 8 in FIG. 6(b) is a stopper screw to lock the sliding of the shaft 5, said stopper screw being screwed with a screw hole 5a formed at the base surface of the shaft 5 from the side of the flange portion 2. Accordingly, after incorporating this device in the apparatus, the locking is released by removing the stopper screw 8 and the shaft 5 advances so as to be a state shown by a real line from a state shown by a chain line, thereby being able to act a fixed tension to the chain or the belt. Further, after removing the stopper screw 8, a cap 9 made of rubber is adapted to be put in place of stopper screw 8 so that dust and water may not be invaded into the casing.

In the conventional apparatus shown in FIGS. 7(a), (b), and (c), cylindrical body 10 is integrally attached to the base end side of the rotor 4 inserted into the cylindrical portion 1 of the casing 3 with welding, bolts or the like and a stopper 11 latches with the cylindrical body 10 is inserted from the base side of the casing 3. In other words, this stopper 11 is inserted into a slit 12 formed at the cylindrical body 10 and a slit 13 formed at the casing 3. By the insertion of the stopper 11, the integrated rotation of the cylindrical body 10 with the rotor 4 is locked. Accordingly, if the stopper is drawn out after securing the tension providing device to a fixed apparatus such as engine etc., the locking is released, thereby being able always to provide the tension to the chain etc. in the engine.

In the conventional apparatus, however, since the shaft 5 is constituted to slide in the axial direction of the casing 3, when the shaft 5 once slides to advance, it is possible to screw the stopper screw 8 with the shaft 5. Accordingly, after the operation, it is impossible to lock again. Further, after the apparatus is secured, it is neither possible to exert the outer force from the top end of the shaft because the shaft is positioned at the inner of the apparatus, nor to wind off the torsion spring to the original state by pushing back the shaft 5 in an antipressing direction. Further, for reuse, in case the shaft 5 is pushed back by removing it from the device, very strong pressure is necessary. In order to decrease this pressure, a lead angle between the rotor 4 and the shaft 5 must be larger, but in this case there occurs a problem that the pressure resistance decreases.

On the other hand, in the conventional device in FIG. 7, since the operation starts from the base side of the casing 3, it is necessary to secure the cylindrical body 10 to the rotor 4 integrally, which causes the complication of the construction.

Further, in the above any device, dust, water, and the like are apt to invade into the casing due to the insufficient sealing by rubber cap 9.

SUMMARY OF THE INVENTION

This invention is performed to solve the stated problems.

In other words, this invention relates to a tension providing device which enables to lock the rotation of the shaft and to wind off the torsion spring from the outside of the device after securing and further to prevent the invasion of dust, water and the like into the casing.

In order to achieve the above objects, in the tension providing device of this invention a rotary shaft rotates in a fixed position is provided in the casing, whereby together with a pressing body screwed with the rotary shaft is restrained with a bearing so that it may not rotate, the pushing body is allowed to slide by the rotation of the rotary shaft. By this, the locking and the winding of the spring from the outside of the device are enabled.

BRIEF DESCRIPTION OF THE DRAWINGS

FIG. 7(a) is a left side view of another conventional device and

FIG. 7(b) is a sectional view thereof.
FIG. 7(c) is a right view thereof.

DETAILED DESCRIPTION OF THIS INVENTION

The detailed descriptions of this invention will be explained as follows.

Figure 1:
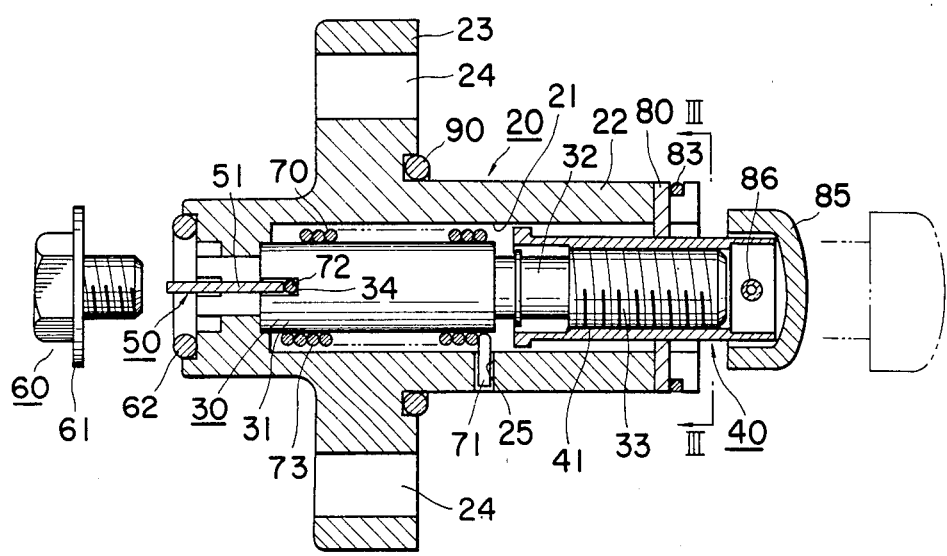
FIG. 1 is a whole longitudinal sectional view of an embodiment to achieve this invention.

A tension providing device according to this invention is, as shown in FIG. 1, provided with a casing 20 wherein an cavity portion 21 is formed in the axial direction, a rotatable shaft 30 inserted into the cavity portion 21 of the casing, a pushing body 40 having a cylindrical shape screwed with the top end portion of the rotatable shaft 30, a stopper 50 and a seal bolt 60 secured to the base portion (left end portion shown in the example) of the casing 20, and the torsion spring 70 which rotates said rotatable shaft.

The casing 20 comprises a horizontally long cylindrical portion 22 and a flange portion 23 extending from said cylindrical portion 22 vertically, said flange portion 23 being provided with securing holes 24 at the upper and lower portions thereof, thereby being fixedly secured to the outer wall of the apparatus such as engine 100 or the like. In this securing state, the cylindrical portion 22 is inserted in the apparatus and the flange portion 23 is positioned at the outside of the apparatus. The top end portion (right end portion in FIG. 1) of the cylindrical portion 22 and base side (left end portion in FIG. 1) of the casing 20 are both opened, and the rotatable shaft 30, the pushing body 40 and the torsion spring 70 are inserted from the top end side thereof, while the stopper 50 and the seal bolt 60 are adapted to secure from the base end side.

The rotatable shaft 30 comprises a large diameter portion 31 and a small diameter portion 32, said large one being inserted into the spring 70, while small one 32 being screwed with the pushing body 40. At the periphery of the small diameter 32 and the inner circumference of the pressing body 40, a male and a female portions are provided respectively whereby the rotary shaft 30 is screwed with the pushing body 40. Further, one end 71 of the torsion spring 70 wherein the large diameter portion 31 is inserted therein, is inserted into a latching hole 25 perforated at the casing 20, while another end 72 thereof is inserted into a latching groove 34 perforated at the base end of the large diameter 31. The large diameter portion 37 of the rotary shaft 30 is inserted into a coil portion 73 of the torsion spring. Accordingly, when the torsion spring 70 is constructed in a state wherein a fixed torque is provided by torsion, the rotary shaft 30 is adapted to rotate by the stability of the torsion spring 70.

Figure 3:
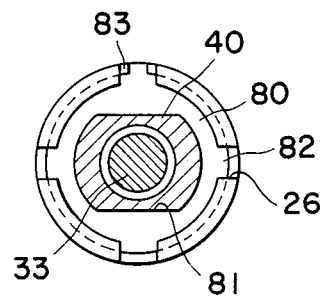
FIG. 3 is a sectional view in III—III line of FIG. 1.

Although the pushing body 40 is inserted into the cavity portion 21 of the casing 20 in a state wherein said pressing body 40 is screwed with the small diameter 32 of the rotary shaft 30, the screwed portion with the rotary shaft 30 is supported by a bearing 80. In other words, the bearing 80 is secured to the top end portion of the casing 20. As shown in FIG. 3, a sliding hole 81 having a nearly a oval shape is formed at the bearing 80 and the pushing body 40 having a same periphery shape as the sliding hole 81 is inserted into the sliding hole 81, whereby the pushing body 40 is adapted to slide in the axial direction without rotation together with the screwed portion with the rotary shaft 30 being supported even if the rotary shaft 30 rotates. Further, together with 4 pieces pawls are protruded from the outer surface of the bearing 80 to the outside thereof and cutaway portions 26 wherein the pawls 82 are inserted therein at top end portion of the casing 20 are formed. Accordingly, the bearing 80 is secured so as not rotate by inserting the pawls 82 into the cutaway portion 26 protruding the bearing 80 to the top end surface of casing 20. At the periphery of the top end portion of the casing 20, a groove is formed and after the insertion of bearing 80 a cir-clip 83 is wound around the groove so that the bearing may not go off. Further, the numeral 85 in FIG. 1 is a cap put on the top end portion of the pushing body 40, said cap being fixed to the pressing body 40 with a spring pin 86 inserted in a vertical direction with the pushing body 40.

Figure 4:
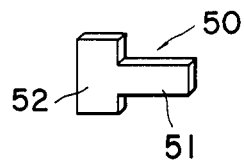
FIG. 4 is a perspective view of a stopper used for FIG. 1.

Then, the stopper 50 secured to the base side of the casing 20 comprises a slender latching piece 51 and an operation piece 52 continuously connected to said latching piece 51 as shown in FIG. 4, said latching piece 51 being adapted to be inserted to said latching groove 34.

Figure 2:
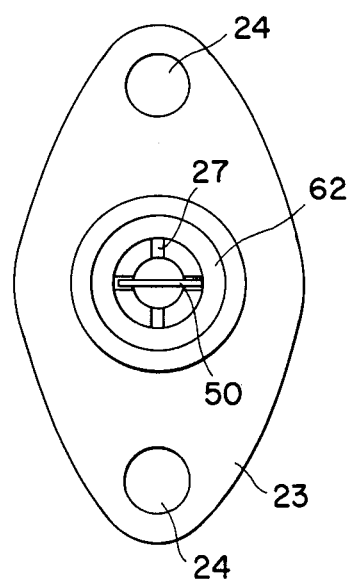
FIG. 2 is a left side view of FIG. 1.

On the other hand, the operation piece 52 is inserted into the side of the base end portion of the casing 20 so as to maintain the latching state with casing 20. Namely, at the base end surface of the casing a cross shape stopper groove 27 is formed as shown in FIG. 2, into which stopper groove 27 is inserted the operation piece 52. By this latching with stopper groove 27, the stopper 50 locks so as not rotate the rotary shaft 30. Further, the winding off of the torsion spring 70 is performed by rotating the operation piece 52 of the stopper 50 in a state that the latching piece 51 is inserted into the latching groove 34 drawing off the operation piece 52 from the stopper groove 27. The seal bolt 60 is screwed with the side of the base end portion, thereby sealing so that dust, water and the like may not invade into the cavity portion 21 of the casing 20. For this purpose, the seal bolt 60 is provided with a brim portion 61 which covers the base end portion of an opened casing. When the seal bolt 60 is screwed, an O-ring 62 is provided between casing 20 and brim 61, thereby, being increased the sealing effect. In FIG. 1, the numeral 90 is an O-ring which seals a space between the flange portion 23 of the casing 20 and the outer wall of the apparatus.

Next, the construction of this device constituted as herein above will be described.

A sub-assembly is constructed by screwing the pushing body 40 with a small diameter 32 of the rotary shaft 30.

Then, together with inserting the torsion spring 70 into the cavity portion 21 from the opening portion of the top end side of the casing 20, one end portion thereof 71 is inserted into a latching hole 25 perforated in the casing 20. Then, the assembly is inserted into the cavity portion 21 positioning the latching groove 34 of the rotary shaft 30 at another end portion 72 of the torsion spring 70.

After that, the stopper 50 is inserted from the open portion of base side of the casing 20, the top end of the latching piece 51 thereof being allowed to latch with the latching groove 34 of the rotary shaft 30. In this state, the stopper 50 is rotated to wind the torsion spring 70 by returning the sub-assembly in a winding direction of the torsion spring 70, thereby storing the energy. In this energy storage state, when the stopper 50 is further pressed and both sides of the operating pieces 52 are inserted into the stopper groove 27 formed at the base end surface of the casing 20, thereby locking the rotation of the rotary shaft 30.

Further, the bearing 80 is secured so that the pressing body 40 may be inserted into the sliding hole 81 of the bearing 80. The pawls 82 of the bearing 80 is inserted into a cutaway portion 26 provided at the top end opening portion of the casing 20 and further the cir-clip 83 is insertingly secured around the groove of the casing from the outside of the bearing 80 to prevent that the bearing 80 is drawn off.

Thus, the operation of the pushing body 40 is confirmed by removing the stopper 50 from the casing 20. After the confirmation, a spring pin 86 covered with cap 85 at the top end of the pushing body 40 is forcebly inserted to be fixed. Then, together with storing the energy by rotating the rotary shaft 30 using the stopper 50 as described above, the rotation of the rotary shaft 30 is locked maintaining the energy storing state as it is.

Figure 5:
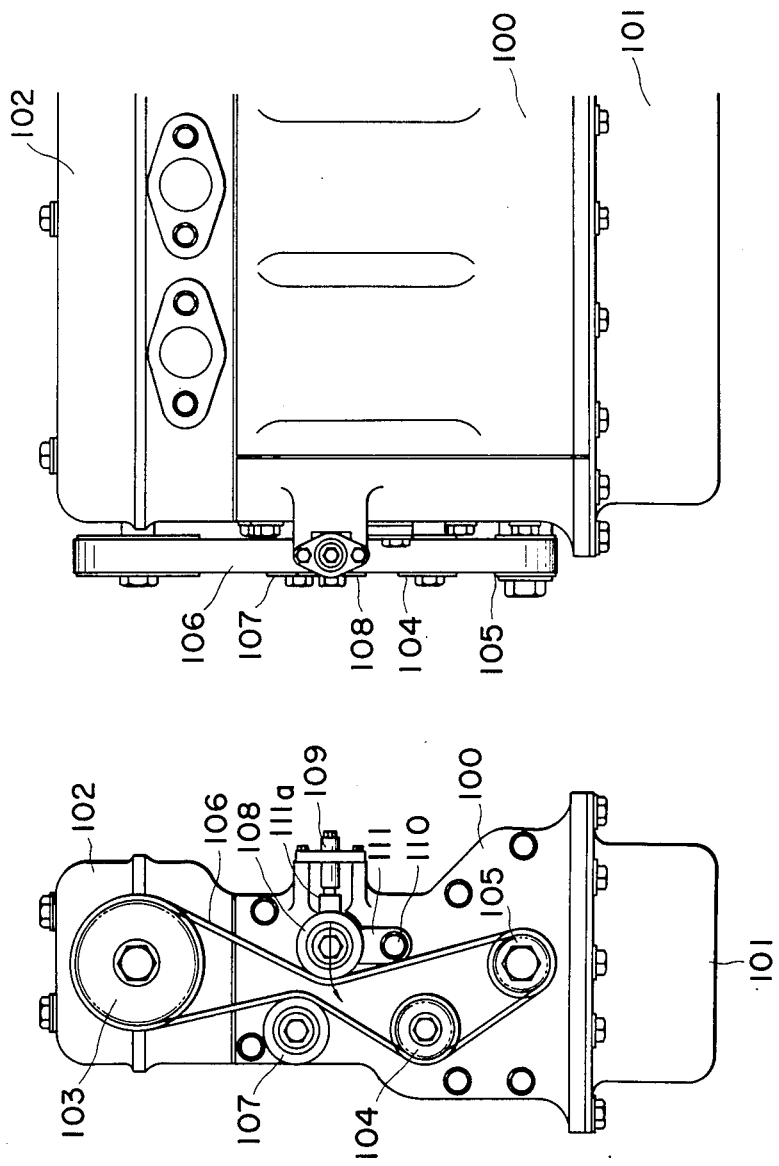
FIG. 5(a) is an elevation view of an engine which shows an using state of the embodiment of this invention and FIG. 5(b) is a side view thereof.
Figure 6:
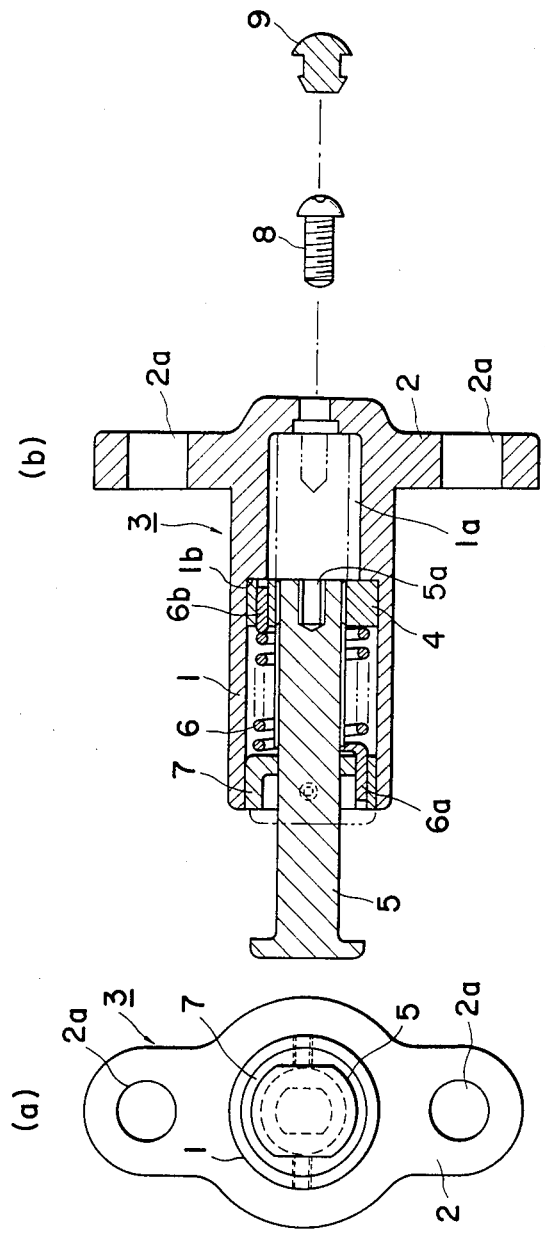
FIG. 6(a) is a left side view of the conventional device.
FIG. 6(b) is a sectional view thereof.

Thus, the construction of this apparatus is completed. In case, for instance, this apparatus is incorporated to the engine, the construction thereof is as follows:

FIGS. 5(a)(b) are an elevation view and a partially side view of the engine respectively. The numeral 100 is a cylinder block, 101 is an oil pan and 102 is a cylinder-head cover. At the elevation of the engine a cam shaft pulley 103, oil pump pulley 104, and a crankshaft pulley 105 are protrudely attached and an endless timing belt 106 is suspended to these pulleys. The timing belt 106 is provided a suitable tension by two idlepulley 107, 108 abut to the belt from outside. In other words, one pulley 108 of these two idle pulleys is secured to a idlepulley bracket 108 wherein one end thereof is rotatably supported by a cylinder block 100 with a center at the axis 110 and the top end thereof is secured to the idle pulley 110 so as to be able to shake the head portion, whereby a proper tension is adapted to provide to the belt 106 by pushing the belt 106 to the arrow direction inclining the pulley 108. In such an engine, this apparatus 109 is made to position the pushing body 40 at the side of the idle pulley availing a secured hole 24 of the casing 20, the top end thereof being allowed to abut to the projection 111a at the top end side of idle pulley bracket 111 to be fixed to the projection of the cylinder block 100 with bolts or the like. After that, the stopper 50 is removed from the casing to operate this apparatus 109. Thus, the O-ring 62 is insertedly fixed to the opening portion of the base side of the casing 20 to seal screwing with seal bolt 60. In this apparatus 109, the pushing body 40 advances outward by the above operation and inclines the idle pulley 108 to the belt 106 side through the idle pulley bracket 111 to provide a proper tension to the belt 106. Although the advancement of the pushing body 40 to the outward stops by balancing with the tension of the belt 106, the pushing body 40 advances again in order to maintain a new balancing state, according to the decrease of the tension of the belt 106.

The following effect can be obtained by this invention as described above:

(1) Since the rotatable shaft rotates only at the fixed position in the casing and does not slide in the axial direction of the casing, the locking and winding off of the torsion spring by the use of stopper from the base side of the casing is possible.

(2) Since the screwing portion of the rotatable shaft with pushing body is supported by bearing, the sliding of the pushing body can be performed smoothly without shaking.

(3) Since the base portion of the casing positioned at the outside the apparatus is sealed with a seal bolt, the invasion of the dust and water can be prevented.

What is claimed is:

1. A tension providing device which comprises: a casing forming a cave portion; a rotary shaft having a top end and a base end; a spring at a fixed position in said cave portion for rotating said rotary shaft; a pressing body having a threaded portion engaging said rotary shaft and sliding in an axial direction by rotation of the rotary shaft and being inserted into the cave portion; a bearing positioned in the cave portion of the casing and having means for supporting said threaded portion of the pressing body and the rotary shaft and restricting the rotation of the pressing body; a stopper to lock the rotation of the rotary shaft by latching it to the casing and the base end portion of the rotary shaft or to be removed for releasing the locking; and a seal member provided at the end portion of the casing after removing the stopper.

2. A tension providing device according to claim 1 wherein the spring is a torsion spring and the rotary shaft is inserted into said torsion spring, one end of the torsion spring latched to the casing and another end latched to the rotary shaft, thereby rotating the rotary shaft.

3. A tension providing device according to claim 1 wherein the top end portion of the rotary shaft forms a male threaded part and the inner surface of the pressing body forms a female threaded part, thereby the rotary shaft with the pressing body are screwed together.

4. A tension providing device according to claim 1 wherein said seal member is a seal bolt.

* * * * *